W. I. WHEELER.
SPEED CHANGING MECHANISM.
APPLICATION FILED JAN. 10, 1917.

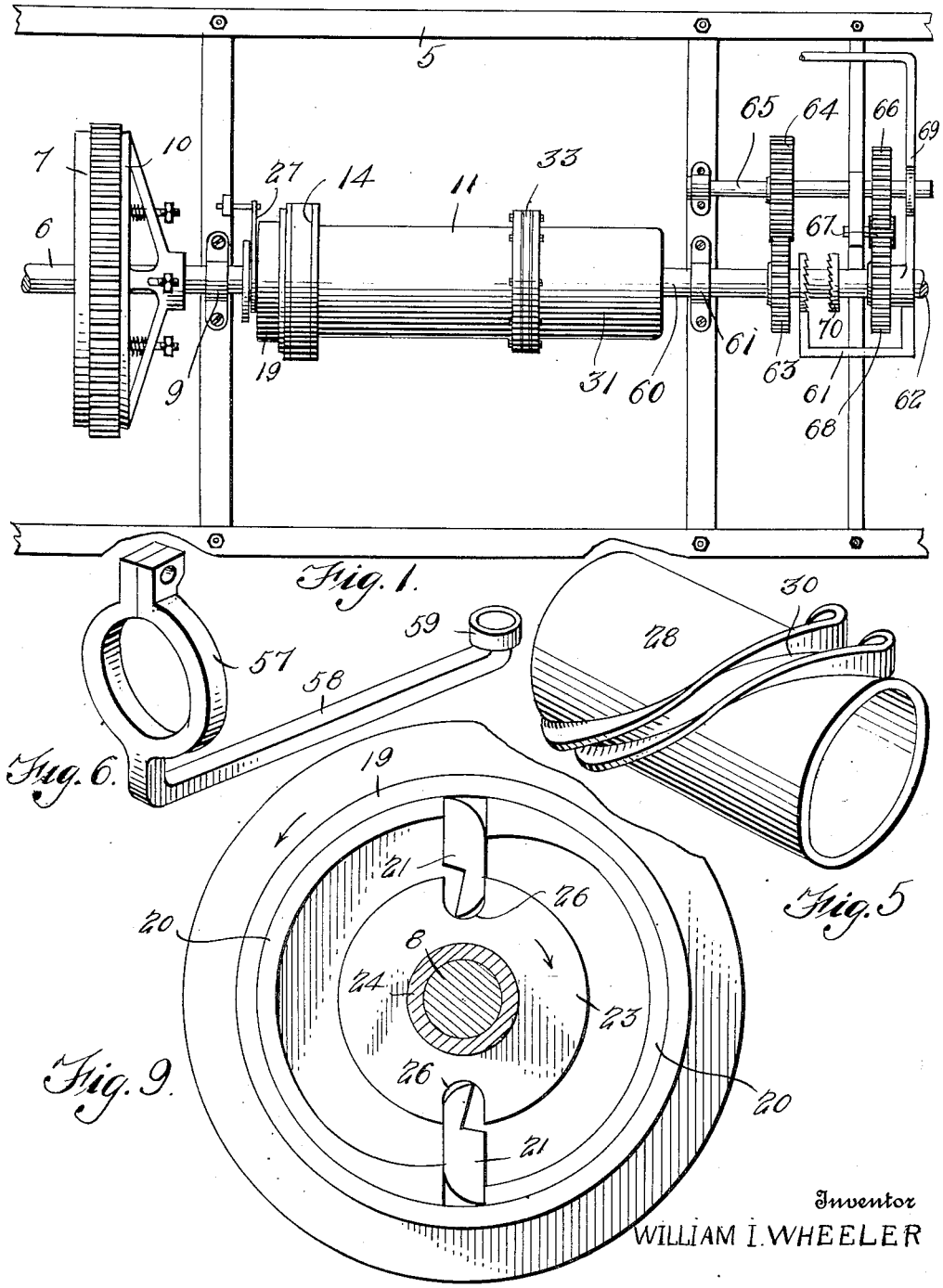

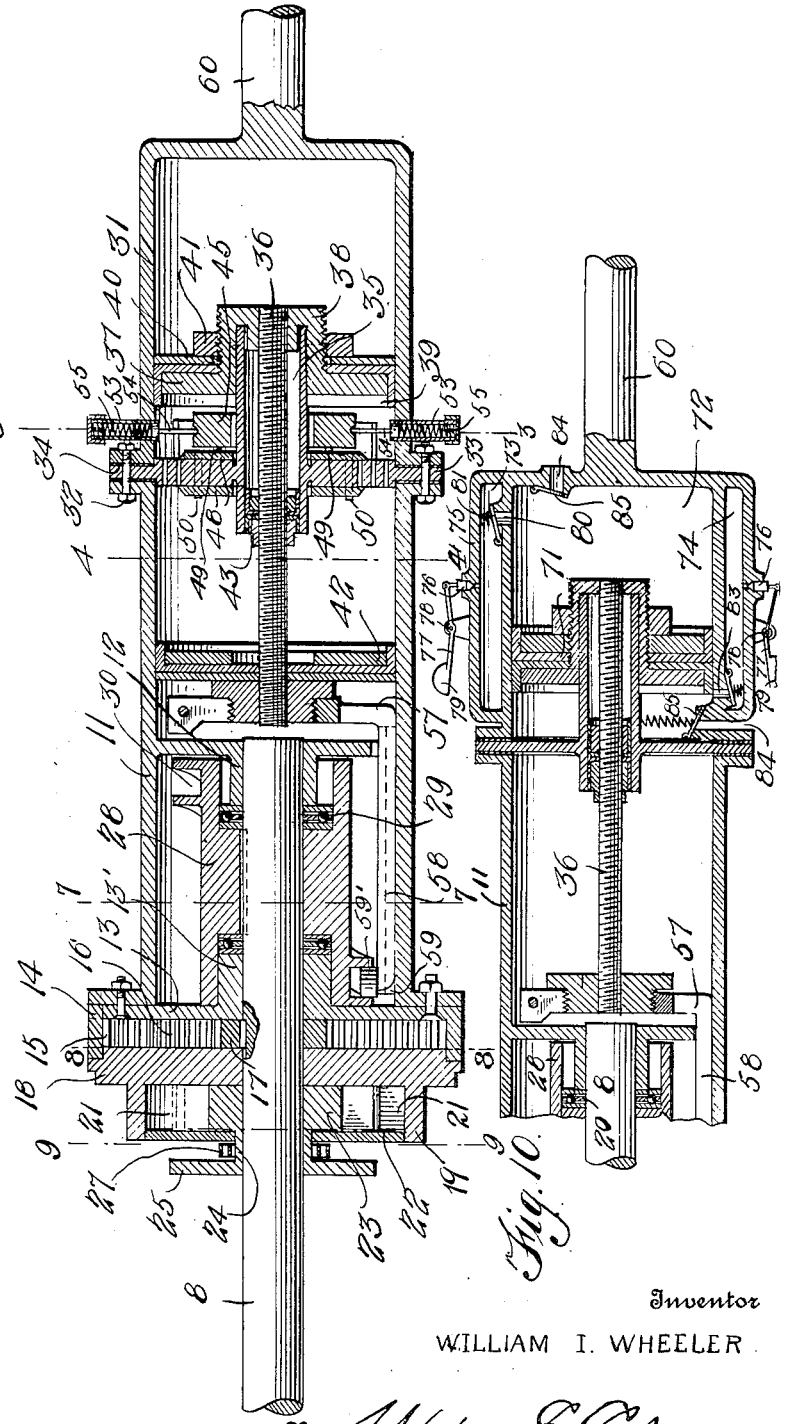

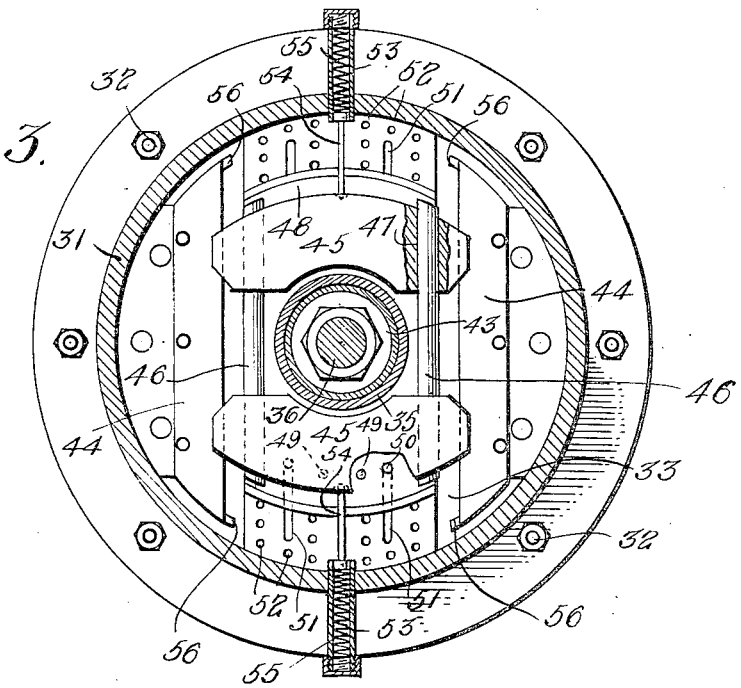
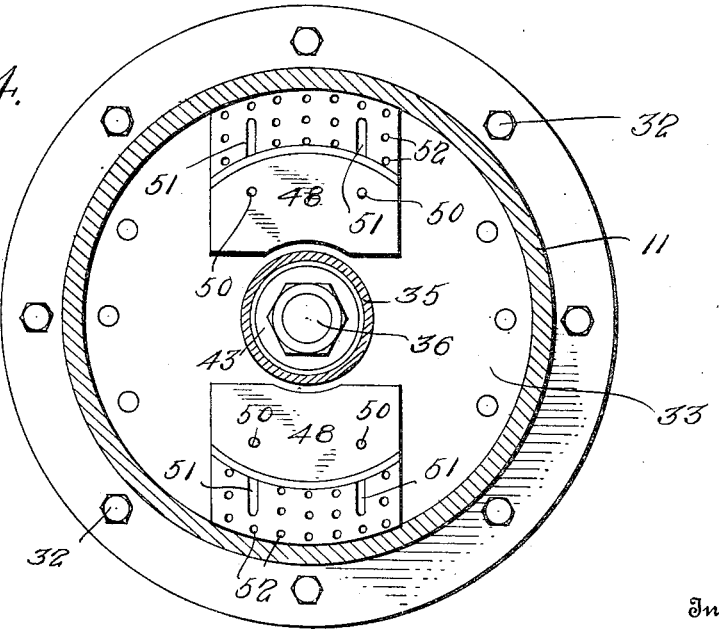

1,245,412.

Patented Nov. 6, 1917.
4 SHEETS—SHEET 4.

Inventor
WILLIAM I. WHEELER

By Watson E. Coleman
Attorney

UNITED STATES PATENT OFFICE.

WILLIAM I. WHEELER, OF SCOTTVILLE, ILLINOIS.

SPEED-CHANGING MECHANISM.

1,245,412.  Specification of Letters Patent.  Patented Nov. 6, 1917.

Application filed January 10, 1917. Serial No. 141,685.

*To all whom it may concern:*

Be it known that I, WILLIAM I. WHEELER, a citizen of the United States, residing at Scottville, in the county of Macoupin and State of Illinois, have invented certain new and useful Improvements in Speed-Changing Mechanism, of which the following is a specification, reference being had to the accompanying drawings.

This invention relates to an improved speed changing mechanism, and has for its primary object to provide means for automatically varying the speed of the driven shaft of a motor vehicle in accordance with the engine load, without necessitating the shifting of gears by means of levers or any other manual operation whatsoever.

The invention has for another of its objects to provide a mechanism of the above character wherein variation in speed is controlled and determined by shifting a body of fluid.

It is further one of the detail objects of my invention to provide a power transmission shaft operatively connected to the engine shaft, a driven shaft clutched to the transmission shaft, and axially and rotatably movable means operatively connected to the transmission shaft, a governor controlled fluid agent operating to prevent the relative axial and rotative movement of the last named means.

It is also a further general object of the invention to materially improve and simplify the speed changing mechanism of motor vehicles and to provide means whereby any intermediate speed between the high and low speed is automatically produced, the mechanism as a whole being of relatively simple construction, positive and reliable in its operation, and capable of manufacture and installation in the power transmission system of the ordinary motor vehicle, at relatively small cost.

With the above and other objects in view, my invention consists in the novel features of construction, combination, and arrangement of parts to be hereinafter more fully described, claimed and illustrated in the accompanying drawings, in which, Figure 1 is a plan view showing my improved speed changing mechanism mounted upon the chassis of a motor vehicle;

Fig. 2 is a longitudinal sectional view;

Fig. 3 is a transverse section taken on the line 3—3 of Fig. 2;

Fig. 4 is a section taken on the line 4—4 of Fig. 2;

Fig. 5 is a detail perspective view of the operating head connecting the transmission shaft to the fluid controlled piston;

Fig. 8 is a section taken on the line 8—8 of Fig. 2; and

Fig. 9 is a section taken on the line 9—9 of Fig. 2.

Fig. 10 is a longitudinal section showing a slightly modified form of the device.

Figure 6:
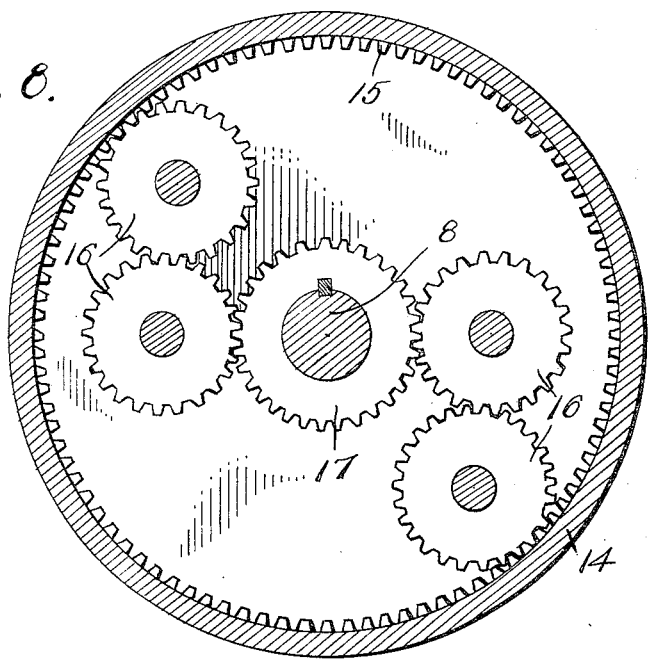
Fig. 6 is a similar view of the connecting means between this head and the pistons.
Figure 7:
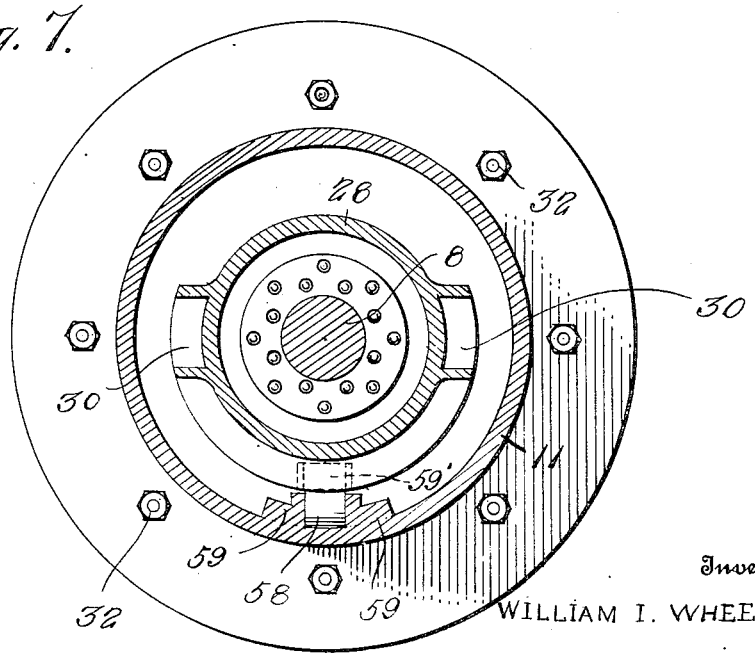
Fig. 7 is a section taken on the line 7—7 of Fig. 2.

Referring in detail to the drawings, 5 designates the chassis or frame of a motor vehicle, 6 the engine shaft, and 7 the fly wheel fixed thereto. The driven shaft 8 is journaled in a suitable bearing 9 on the frame of the machine, and a clutch 10 of any conventional form is mounted upon one end of said shaft for engagement with the clutch face of the fly wheel 7.

The shaft 8 extends into one end of a cylindrical casing 11 and is mounted and supported in an internal bearing 12 integrally formed with the casing wall. This end of the casing is secured to a head plate 13 having an annular, laterally projecting flange 14 internally toothed, as at 15. Upon the face of an opposed plate 18, pairs of pinions 16 are mounted upon diametrically opposite sides of the driven shaft and have meshing engagement with each other. One pinion in each pair engages the gear teeth 15 and the other pinion in each pair is in mesh with a gear 17 keyed or otherwise fixed upon the driven shaft 8. A plate 18 is loosely mounted upon the shaft 8 to rotate independently of the casing 11 and is provided with a laterally projecting, annular flange 19 with which an internal, sectional brake or clutch band 20 is adapted to frictionally engage. Between the opposed ends of the clutch band sections, the clutch dogs 21 are arranged, one end of each clutch band section being thickened or enlarged as clearly seen in Fig. 9 of the drawings. The outer side of the housing or chamber formed by the annular flange 19 is closed by means of the plate 22. A cylindrical member 23 is disposed between the plates 18 and 22 and loosely engaged on the shaft 8, said member having a reduced hub or neck portion 24 extending through an opening in the plate 22, said hub having a flange 25 formed on its outer end. The member 22 is provided in its periphery, at diametrically opposite points, with recesses 26 to receive the inner ends of the respective clutch dogs 21. One end of a spiral leaf spring 27 is secured to the reduced hub 24 of the member 23, the other end of this spring being suitably fixed to the frame 5 of the machine, as clearly seen in Fig. 1 of the drawings. By the provision of this clutch, any reverse rotation of the shaft 8 and the back firing in the engine is effectually prevented, and at the same time the shocks or jars will be absorbed through the medium of the spring 27 and not transmitted to the body of the vehicle through the frame or chassis thereof. The operation of this clutch will be apparent from reference to Fig. 9. In the rotation of the part 18 in the direction indicated by the arrow, the clutch band sections 20 are inactive, but any tendency of this part 18 to rotate in the opposite direction causes the clutch dogs 20 to rock in the recesses 26 of the part 23, and their outer ends acting between the ends of the clutch band sections expand the latter against the inner face of the flange 19.

A cylindrical head 28 is keyed upon the driven shaft 8 within the end of the cylindrical casing 11, the opposite ends of said head being recessed to receive the internal bearing 12 of the casing and a bearing boss 13' formed on the head plate 13. Suitable anti-friction bearings, indicated at 29, are arranged in these recessed ends of the head so as to minimize frictional resistance to the relative rotation of said head and the casing 11. The cylindrical head 28 is provided upon its periphery with a reverse, spiral, cam channel 30 extending substantially the entire length of said head. The particular purpose of this channel will hereinafter fully appear.

To the opposite end of the cylindrical casing 11, a detachable casing section 31 is fixed. The opposed ends of the casing sections having outwardly projecting flanges, receive suitable fastening bolts indicated at 32. Between these flanges, the outer edge of a plate 33 is interposed, and annular gaskets 34 are disposed between the opposite sides of the plate and the flanges on the casing sections. The plate 33 is centrally formed with a sleeve 35, the major portion of which projects from one side of the plate, the relatively short end portion of the sleeve projecting from the opposite side of said plate. Through the sleeve 35, a threaded rod 36 is longitudinally movable. A plate 37 constituting a piston head is centrally provided with an opening sufficiently large to receive the end of the sleeve 35. This plate is formed with a reduced, interiorly and exteriorly threaded portion 38 projecting from one side of this plate which is adapted to be engaged upon one end of the rod 36. A leather piston ring 39 is engaged over the outer edge of the plate 37 between the same and the wall of the casing section 31. This leather is securely clamped against one side of the plate 37 by the washer 40 which is in turn engaged by an interiorly threaded annulus 41 threaded upon the reduced portion 38 of the plate 37. In a similar manner, a piston 42 is connected to the opposite end of the rod 36. While I have referred to this particular construction and connection of the spaced pistons, it will be manifest that various other alternative piston constructions might be employed. The pistons, of course, operate in the respective chamber sections 11 and 31, and packing means shown at 43 is also engaged upon the medial portion of the rod 36 and operates in the sleeve 35 to effectually prevent any movement of fluid from one chamber section to the other through said sleeve.

Guides 44 are disposed in parallel relation to each other and secured to one face of the plate 33 upon opposite sides of the sleeve 35. Between these guides, governor blocks 45 are disposed, the ends of the blocks being notched or recessed to receive the guide members. To the opposite ends of each of the governor blocks 45, rods 46 are securely fixed at one of their ends, and these rods on each block are loosely movable through openings 47 in the corresponding ends of the other of the governor blocks. Slide plates 48 are engaged upon the opposite side faces of the plate 33, and the plates 48 upon the same side of the plate 33 as the governor blocks are connected to the respective governor blocks by the pins 49. It will be understood that a pair of the plates 48 are arranged on each side of the plate 33 and are shiftable radially with respect thereto. The corresponding plates 48 on the opposite sides of the plate 33 are connected to each other by the pins 50 which are shiftable in slots 51 formed in the plate 33. The plate 33 is provided with two series of openings or ports 52 in diametrically opposed relation to each other, over which the corresponding plates 48 on opposite sides of the plate 43 are adapted to slide. These series of ports may be arranged as shown in Fig. 3, or various other arrangements of the ports may be adopted as desired.

In the wall of the casing section 31, at diametrically opposite points, the cylindrical housings 53 are threaded or otherwise detachably mounted, and a pin 54 is longitudinally movable in each of these housings. These pins bear at their inner ends in suitable seats provided in the governor blocks 45 and are urged inwardly by means of the coil springs 55 arranged in said housing. Thus, it will be seen that the outward radial movement of the governor blocks is effectively cushioned. This outward movement of the governor blocks is limited by the stop flanges 56 formed upon the opposite ends of the guides 44.

To the body of the piston 42, at its exteriorly threaded end portion, a split collar or yoke 57 is securely clamped. This yoke is formed upon one end of a rod 58 which is longitudinally movable in a guide channel 59 formed upon the wall of the casing 11. The other end of this rod or bar 58 is formed with an angularly projecting stud having a roller or sleeve 59 mounted thereon. This roller is engaged in the spiral cam groove 30 formed upon the cylindrical head 28.

The casing section 31 is formed with or connected to the end of a transmission shaft 60 which is mounted in bearings 61 on the frame of the machine. This shaft includes a relatively rotatable section 62. A gear 63 is fixed to the shaft section connected to the casing section 31, and meshes with a gear 64 secured upon the countershaft 65. A second gear 66 fixed upon this shaft, meshes with the reversing gear 67 suitably mounted in the machine frame. With this reversing gear, a longitudinally shiftable gear 68, keyed upon the shaft section 62, is adapted to be engaged. Thus, the rotation of the shaft section 62 extending to the rear driven axle of the machine, may be reversed when desired. The gear 68 is shifted into mesh with the reversing gear 67 by means of a lever 69, and the shiftable clutch element 70 is simultaneously actuated to disconnect the transmission shaft sections. Any other desired means for establishing or disestablishing the direct driving connection between the sections of the transmission shaft may be employed.

In the operation of the above described embodiment of the invention, it will be understood that a body of fluid, preferably oil, is disposed within the casing sections 11 and 31 between the spaced pistons on the rod 36. In the operation of the engine, rotation is of course transmitted from the shaft 8 through the medium of the gears 17 and 19 to the sections of the casing, and as the speed of the engine increases, the governor weights 45 move outwardly under centrifugal force against the action of the spring-pressed pins 54 and successively close the rows of ports in the two series 52 and prevent the passage of oil from one side of the plate 33 to the other so that the axial movement of the pistons caused by the rotating head 28 co-acting with the roller on the end of the rod or bar 58, is gradually retarded and finally stopped, so that the shiftable pistons become locked and rotate together with the casing sections and the shaft 8 at the maximum speed. When the engine labors under a heavy load as when ascending an incline, the centrifugal force gradually decreases and the governor members 45 move inwardly, thus uncovering the ports 52 so that the pistons may be shifted on the casing sections as the walls of the spiral channel 30 co-act with the roller on the end of the bar 58. The casing sections and the transmission shaft will now be rotated through the medium of the pistons with relation to the driven shaft 8 and at a relatively low speed, but utilizing the full driving power of the engine. This power is of course, transmitted through the engine shaft 8 and the gear 17 thereon which drives the pinion 16 interposed between said gear and the internal gear 15 on the flange 14. The pinions 16 being thus rotated relative to the part 13 which is fixed to the casing, it is manifest that the casing 11 will be driven at a relatively low speed. This action continues until the governor weights are at the limit of their inward movement and there is a free flow of the body of fluid through the ports 52 which will permit of a practically unretarded longitudinal movement of the piston. The transmission shaft will then be driven at the lowest possible speed, which is of course determined by the ratio of the gears 17 and 16. In this manner, it will be seen that the speed of rotation of the transmission shaft is automatically changed or decreased in exact accordance with the engine load, and that any number of intermediate speeds between high and low may be obtained. I am thus enabled to propel the machine at the highest possible speed under the instant conditions of grade or road surface and with a maximum driving power.

In Fig. 10 of the drawings, I have illustrated a slightly modified construction whereby compressed air instead of oil is used as the medium for locking and releasing the relatively movable connection between the driven and transmission shafts. In this construction, a single piston 71 operates within the chamber 72 which is provided on diametrically opposite sides with longitudinal channels or passages 73 and 74 respectively, in its wall. This casing is connected to the transmission shaft. In the outer wall of each of the passages 73 and 74, a port 75 is provided. These ports are closed by valves 76, each of which is connected to one end of a lever 77 fulcrumed intermediate of its ends, as at 78, said lever at its other end being weighted, as at 79. The passage 73 is further provided in its inner wall, at one end, with an outlet port 80 from the chamber 72 which is normally closed by an outwardly opening, spring-held flap valve 81. A similar valve 82 also closes the port 83 at the relatively opposite end of the other air passage 74. At relatively opposite ends, ports 84 are provided for the intake of atmospheric air into the chamber 72, which ports are normally closed by the flap valves 85. The single piston 71 used in this modified construction, is connected to the cam head on the driven shaft in precisely the same manner as above described.

The operation of the alternative form of the invention will be at once manifest. In the movement of the piston 71 in one direction, atmospheric air is drawn into the chamber 72 through one of the ports 84, and the air back of the piston is forced out of the port 83 into the passage 74, and the release of the air from this passage is determined by the centrifugal force induced by the rotation of the casing which operates to throw the weighted end of the lever 77 outwardly and hold the valves 76 in closed position. As the centrifugal force decreases, the valves 76 are lifted from their seats so that the air cushion behind the piston is released and the piston may reciprocate more or less freely within the chamber 72 in accordance with the decrease in centrifugal force and the extent of opening movement of the valve. The result obtained in transmission of power from the driven shaft through the transmission shaft is precisely the same as hereinbefore stated. In this latter construction, however, it is to be noted that by the use of air as a retarding medium to the reciprocation of the piston, I am enabled to dispense with one of the pistons as shown in the first described construction.

From the foregoing description, taken in connection with the accompanying drawings, the construction, manner of operation and several advantages of my improved speed changing mechanism will be clearly understood. The device is positive and reliable in its action and operates to vary the speed of the transmission shaft exactly in accordance with the variation in the load borne by the engine, so that there is at all times and under all conditions, obtained the maximum driving power which the engine is capable of generating. This desirable result is obtained without requiring the manual manipulation of levers or other elements, whereby gears are shifted into different driving relations. The apparatus as a whole is likewise simple in its construction, not liable to get out of order, and can be readily manufactured and installed for use in motor vehicles at comparatively small cost. The invention may, of course, be constructed in various sizes and employed for other purposes than that herein referred to. The form, construction and relative arrangement of the several elements herein shown and described are likewise susceptible of considerable modification and I, therefore, reserve the privilege of adopting all such legitimate changes as may be fairly embodied within the spirit and scope of the invention as claimed.

Having thus fully described my invention, what I desire to claim and secure by Letters Patent is:

1. In a speed changing mechanism, a driven shaft, a transmission shaft, an operating connection between said shafts axially shiftable with respect thereto, such shifting movement of said connecting means being retarded by a mobile medium, and automatically actuated means offering a variable resistance to the movement of said medium in the axial movement of said connecting means.

2. In a speed changing mechanism, a driven shaft, a transmission shaft, axially and rotatably movable means operatively connecting said shafts to each other, the axial movement of said means being resisted by a mobile medium, and automatically actuated means for controlling the movement of said medium to vary the speed of the transmission shaft with respect to the driven shaft.

3. In a speed changing mechanism, a driven shaft, a transmission shaft, means operatively connecting the driven and transmission shafts and axially shiftable with respect thereto, the axial movement of said connecting means being resisted by a mobile medium, and centrifugally actuated means controlling the movement of the mobile medium, whereby the speed of the transmission shaft is varied in relation to the driven shaft.

4. In a speed changing mechanism, a driven shaft, a transmission shaft and means operatively connecting said shafts including casing sections providing spaced chambers, rigidly connected pistons operating in the respective chambers, means operatively connecting the pistons to the driven shaft whereby the pistons are axially shifted with respect to said shaft, and centrifugally actuated means for controlling the passage of a fluid from one of said chambers to the other, whereby the axial movement of the pistons is retarded and the speed of the transmission shaft varied in accordance with the working load of the driven shaft.

5. In a speed changing mechanism, a driven shaft, a transmission shaft and means operatively connecting said shafts including casing sections providing spaced chambers, rigidly connected pistons operating in the respective chambers, a cylindrical head fixed upon the driven shaft and having a spiral cam groove extending longitudinally thereof, means connected to the pistons engaged in the groove, whereby the pistons are shifted axially in the rotation of the driven shaft, and a centrifugal governor controlling the passage of the fluid from one of the chambers to the other, whereby the shifting of the pistons is retarded and the speed of rotation of the transmission shaft varied in accordance with the load borne by the driven shaft.

6. In a speed changing mechanism, a driven shaft, a transmission shaft, means operatively connecting said shafts including a casing divided by a partition plate into separate chambers, said plate being provided with spaced series of ports, connected pistons operating in said chambers, means operatively connecting the pistons to the driven shaft to impart a reciprocating movement to the pistons, the reciprocating movement of the pistons being resisted by a body of fluid disposed between the pistons and the partition plate, and centrifugally actuated means mounted upon the partition plate to open and close the ports therein and permit of the passage of the fluid from one chamber to another and thereby permit the pistons to reciprocate or to become locked in connection with the driven shaft, whereby the speed of the transmission shaft will be automatically varied.

7. In a speed changing mechanism, a driven shaft, a transmission shaft, means operatively connecting said shafts including a casing having a partition wall dividing the same into two chambers, connected pistons operating in said chambers, means operatively connecting the pistons to the driven shaft to impart a reciprocating movement to the pistons, said partition plate being provided on diametrically opposite sides thereof with a series of ports to control the passage of a fluid medium from one chamber to the other, slide plates mounted upon the opposite faces of the partition wall for movement over said ports, and centrifugally controlled governor weights connected to the slide plate to move the same as the speed of the driven shaft increases, whereby the ports are closed to prevent the reciprocation of the pistons and cause the same to rotate as a unit in the driven shaft, the movement of the slide plates being reversed as the engine speed decreases to permit of the passage of the fluid from one chamber to the other, whereby the pistons may reciprocate to vary the speed of rotation of the transmission shaft in accordance with the working load of the driven shaft.

8. In a speed changing mechanism, a driven shaft, a transmission shaft, means operatively connecting said shafts including spaced pistons, means connecting the pistons to the driven shaft to impart an axial movement to said pistons in the rotation of the driven shaft at different speeds, the movement of said pistons being resisted by a mobile medium disposed between the same, and means for controlling the movement of the mobile medium on variation in speed of the driven shaft.

9. In a speed changing mechanism, a driven shaft, a transmission shaft and means connecting said shafts including casing sections providing spaced chambers, rigidly connected pistons operating in the respective chambers, means for automatically shifting the pistons axially in the chambers upon variations in the speed of the engine shaft with respect to the transmission shaft, the axial movement of the pistons being retarded by a mobile medium, and means retarding the movement of said medium from one chamber into the other, whereby the speed of the transmission shaft is varied in accordance with the load borne by the driven shaft.

In testimony whereof I hereunto affix my signature in the presence of two witnesses.

WILLIAM I. WHEELER.

Witnesses:
M. C. LYDDANE,
M. R. WILSON.